United States Patent [19]
Street

[11] Patent Number: 6,158,394
[45] Date of Patent: Dec. 12, 2000

[54] APPARATUS FOR AND A METHOD OF CONTROLLING THE POSITION OF AN ANIMAL IN A SPACE HAVING A FLOOR

[75] Inventor: Michael J. Street, Bedford, United Kingdom

[73] Assignee: Alfa Laval Agri AB, Tumba, Sweden

[21] Appl. No.: 09/297,155

[22] PCT Filed: Sep. 26, 1997

[86] PCT No.: PCT/SE97/01625

§ 371 Date: Apr. 26, 1999

§ 102(e) Date: Apr. 26, 1999

[87] PCT Pub. No.: WO98/19522

PCT Pub. Date: May 14, 1998

[30] Foreign Application Priority Data

Nov. 5, 1996 [SE] Sweden ................................. 9604052

[51] Int. Cl.[7] .................................................. A01K 15/00
[52] U.S. Cl. .......................... 119/753; 119/722; 119/712; 119/14.08
[58] Field of Search ................................ 119/14.08, 480, 119/722, 752, 753, 712; 5/102, 105; 248/133, 139, 141, 142

[56] References Cited

U.S. PATENT DOCUMENTS 3,419,267  12/1968  Stolle .
4,354,654  10/1982  Werner et al. ............................ 248/371
4,491,318   1/1985  Francke .................................... 482/147
4,659,053   4/1987  Holley et al. ............................ 248/663
4,966,364  10/1990  Eggenberger ............................ 482/146
5,292,296   3/1994  Davignon ................................ 482/146
5,584,787  12/1996  Guidry .................................... 482/146

FOREIGN PATENT DOCUMENTS 0194729   9/1986   European Pat. Off. .
0619941  10/1994   European Pat. Off. .
3420879  12/1985   Germany .
WO8502973  7/1985  WIPO .
WO9313651  7/1993  WIPO .

Primary Examiner—Peter M. Poon
Assistant Examiner—Yvonne R. Abbott
Attorney, Agent, or Firm—Hovey, Williams, Timmons & Collins

[57] ABSTRACT

An apparatus and a method are provided for controlling the position of an animal in a space (1) having a floor in order to facilitate the performance of an animal-related action. The floor comprises at least one primary floor portion (10), at which it is desirable that the animal stands during the performance, and at least one secondary floor portion (11), at which it is desirable that the animal does not stand during the performance. The apparatus comprises an activatable device (14) provided to enable a wobbling movement of the secondary floor portion (11) upon activation.

14 Claims, 3 Drawing Sheets

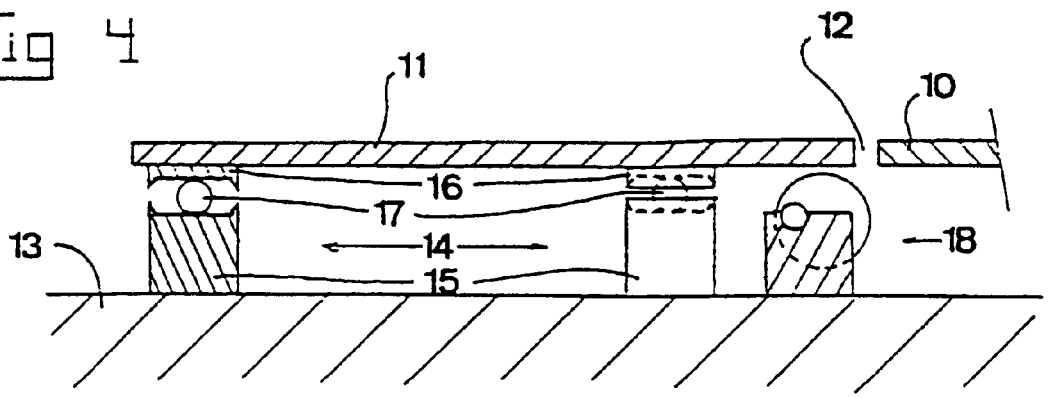
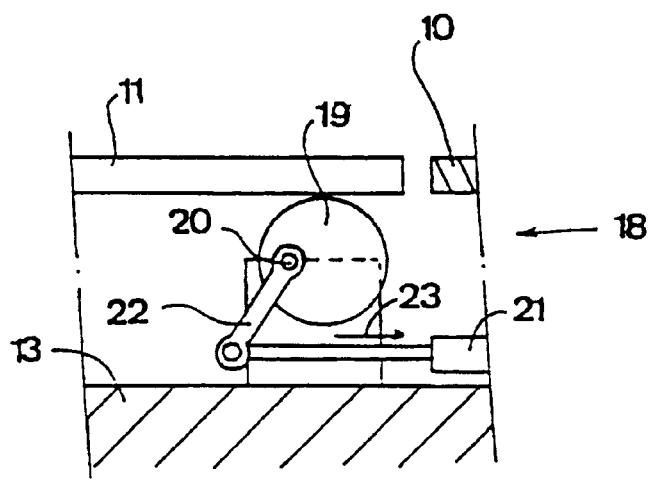
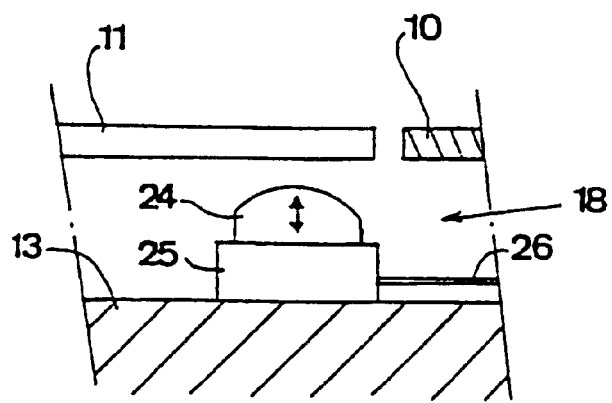

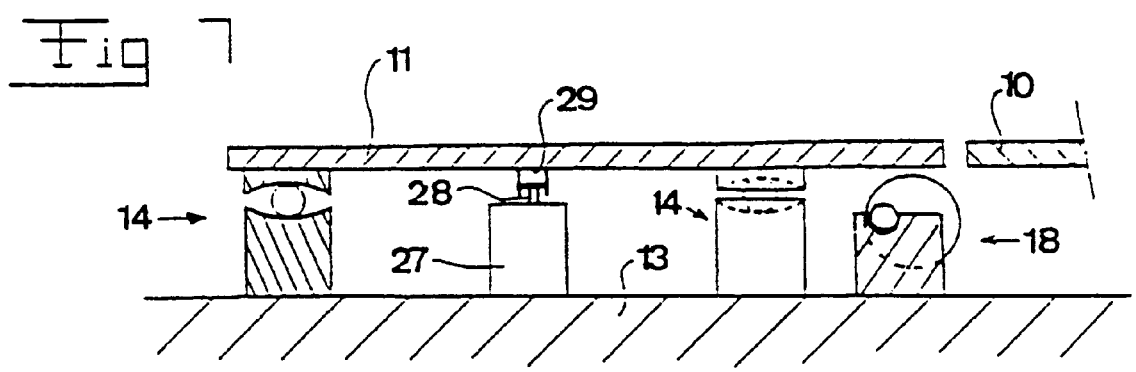

APPARATUS FOR AND A METHOD OF CONTROLLING THE POSITION OF AN ANIMAL IN A SPACE HAVING A FLOOR

BACKGROUND OF THE INVENTION

The present invention refers to an apparatus for controlling the position of an animal in a space having a floor in order to facilitate the performance of an animal-related action, said floor comprising at least one primary floor portion, at which it is desirable that the animal stands during said performance, and at least one secondary floor portion, at which it is desirable that the animal does not stand during said performance. Furthermore, the present invention refers to a method of controlling the position of an animal in a space having a floor in order to facilitate the performance of an animal-related action, said floor comprising a primary floor portion, at which it is desirable that the animal stands during said performance, and a secondary floor portion, at which it is desirable that the animal does not stand during said performance,

DESCRIPTION OF THE PRIOR ART

It is known to perform automatic milking of animals in a milking stall provided in a barn in which the animals are allowed to walk about freely and find their way voluntarily to the milking stall. The animals entering the milking stall are automatically identified with the aid of a computer connected to identification means. By means of the computer, in which facts concerning each animal, when it was last milked, etc. are stored, an automatic handling device is activated to pick up the teatcups of a milking machine and attach them to the teats of the animal.

One problem in connection with such automatic milking is to determine the position of the teats of the animal being present in the stall in order to enable said attachment. To this end different search systems have been developed. However, even if such search systems are developing and becoming more and more sophisticated, they are still insufficient if the animal does not stand in the desired position, e.g. if the rear legs of the animal are placed close to each other or if one or both of the rear legs are placed in a relatively forward position.

In order to control the position of the animal without physically forcing it, it has been suggested to provide a milking stall with a floor having plane, steady floor portions, at which it is desirable the animal stands, and a central floor portion therebetween. The central floor portion is provided with a grid of longitudinal bars, which an animal entering the stall would avoid, since it is not very comfortable to an animal to step on such a grid. Moreover, if the animal enters the stall from a longitudinal side, which is the case in connection with the so called tandem stalls, it is unavoidable that the animal has to step on such central grid. Therefore, the animal is not encouraged to enter such a milking stall.

Furthermore, WO-A-85/02973 discloses a milking stall which has a central portion, which provides a flat surface when the animal enters the stall and which thereafter is moved so that the central portion is inclined downwards to the sides of the stall. Thereby, the feet of the animal being present in the stall are sliding down and apart to a desired leg position. However, such a floor requires a relatively powerful drive mechanism, and it does not enable control of the leg position in the longitudinal direction of the stall.

EP-A-619 941 discloses a milking stall with a floor having plane, steady floor portions, at which it is desirable that the animal stands during the attachment of the teatcups, and uncomfortable floor portions, at which it is desirable that the animal does not stand during said attachment. The uncomfortable floor portions comprise a number of different surfaces inclining in different directions. However, such a floor also has the disadvantage that the animal entry or departure is difficult and thus time-consuming, and moreover, the animal is not encouraged to visit the milking stall.

EP-A-194 729 discloses a milking stall comprising a milking machine and animal positioning means provided to facilitate the attachment of the teatcups of the milking machine. The positioning means includes two flaps movable by means of a hydraulic or pneumatic cylinder from a substantially horizontal position, in which the flaps flush with the floor, to a substantially vertical position. If the animal stands with a foot on one of these flaps the foot will slide down as the flap is moved to said vertical position. Moreover, the positioning means includes two guide plates which extend in an upward direction and are movable in a lateral direction, thereby forcing the legs apart. The positioning means disclosed in this document are relatively complicated and require a powerful drive mechanism for the performance of a proper positioning.

SUMMARY OF THE INVENTION

The object of the present invention is to overcome the disadvantages mentioned above and provide an improved way of controlling the position of the animal.

This object is obtained by the apparatus initially defined and characterized in that the apparatus comprises activatable means provided to enable a wobbling movement of said secondary floor portion upon activation. Such a floor may be steady and essentially flat when an animal enters or leaves the space, and the wobbling, unsteady portions may be activated when the animal is present in the space. The animal will avoid standing at such wobbling, unsteady floor portions and thus will position itself in a desired, appropriate position so that an animal-related action may be performed in a fast and efficient manner.

According to an embodiment of the present invention, said activatable means comprises a support device provided to support the secondary floor portion and allow said wobbling movement.

According to a further embodiment of the present invention, said support device comprises a first support surface associated with said second floor portion, a second support surface associated with the ground, and a ball-shaped member provided between said surfaces. By means of such a bag device the movement of the secondary floor portion is not controllable by the animal. In particular, said first and second support surfaces are concave. Thereby, the secondary floor portion will return to a rest position.

According to a further embodiment of the present invention, said activatable means comprises drive means provided to generate said wobbling movement.

According to a further embodiment of the present invention, said activatable means comprises a locking device adapted to be put in one of a first position, at which the secondary floor portion is locked, and a second position at which the secondary floor portion is unlocked and thus unsteady. Such a locking device may comprise a cam device being rotatable between said first position, at which the cam device abuts the secondary floor portion, and said second position, or alternatively a piston device movable between said first position, at which the piston device abuts the secondary floor portion, and said second position.

According to a further embodiment of the present invention, means are provided for performing said animal-related action regarding the animal being present in said space. Said performing means may comprise an automatic handling device and animal-related means, e.g. at least one teatcup to be attached to a teat of said animal by said automatic handling device.

According to a further embodiment of the present invention, the secondary floor portion is visibly indicated in such a manner that it is recognizable by the animal. By such an indication it is easier for the animal to remember the location of the uncomfortable wobbling floor portions from one occasion to another. Consequently, the animal may itself avoid to step on the secondary floor portion and thus take an appropriate position immediately upon entry into the space.

The object stated above is also obtained by the method initially defined and characterized by the method steps of locking both the floor portions in a steady condition when the animal enters said space and enabling wobbling of the secondary floor portion during the performance of said animal-related action.

BRIEF DESCRIPTION OF THE DRAWINGS

The present invention will now be explained more closely by the description of different embodiments thereof and with reference to the drawings.

FIG. 4 shows a sectional view similar to the one of FIG. 3 but with a support device according to an alternative embodiment.

FIG. 5 shows a partly sectional view of a locking device of the first embodiment.

FIG. 6 shows a partly sectional view of a locking device according to another embodiment.

FIG. 7 shows a sectional view similar to the one of FIG. 3 but with a drive means according to another embodiment.

DETAILED DESCRIPTION OF DIFFERENT EMBODIMENTS

Figure 1:
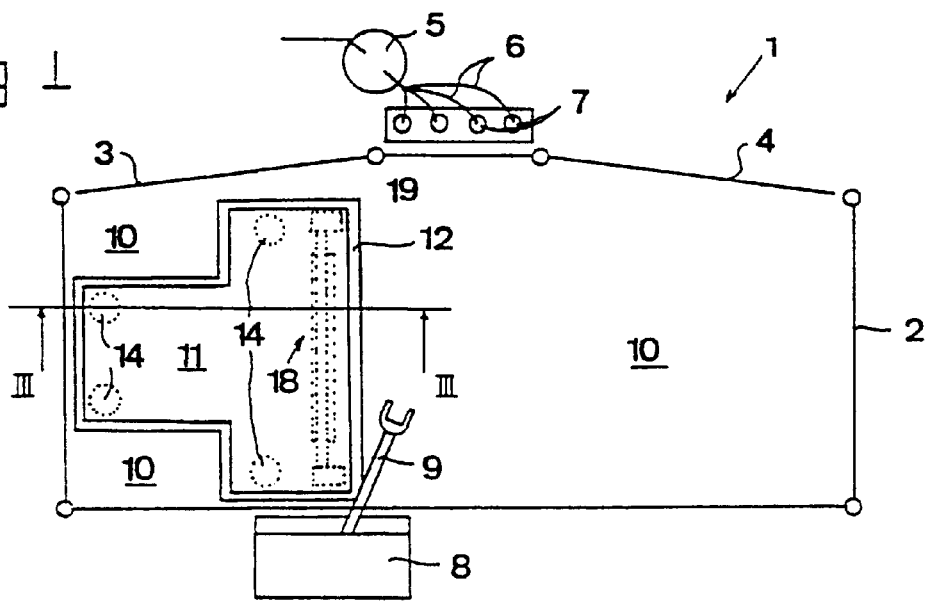
FIG. 1 shows a view from above of a first embodiment of a milking stall according to the present invention.

With reference to FIG. 1, there is disclosed a milking stall 1 for housing a cow (not disclosed) to be milked, which milking stall 1 may be provided in a barn (not disclosed) housing many cows walking about freely. The milking stall 1 comprises enclosure means in the form of a surrounding grid device 2 defining a space in the milking stall 1. The grid device 2 comprises an inlet gate 3 and an exit gate 4. In connection to the milking stall 1, there is provided a milking machine, merely represented by a receptacle container 5, four milk conduits 6 and four schematically disclosed teatcups 7 to be attached to a respective teat of the cow being present in the milking stall 1. For said attachment, there is provided an automatic handling device 8 a gripping arm 9. The gripping arm 9 may be controlled to grip successively a teatcup 7 and attach it to a teat of the cow.

The milking stall 1 comprises a floor having primary floor portions 10, at which it is desirable that the animal stands during the attachment of the teatcups, and a secondary floor portion 11, at which it is desirable that the animal does not stand during said attachment. The embodiment disclosed in FIG. 1 is configured to make the cow standing with her rear legs spaced apart from each other and at a position at the rear end of the milking stall 1. The primary floor portion 10 is separated from the secondary floor portion by a small gap 12 enabling the secondary floor portion 11 to move in a horizontal plane relative to the primary floor portions 10.

Figure 2:
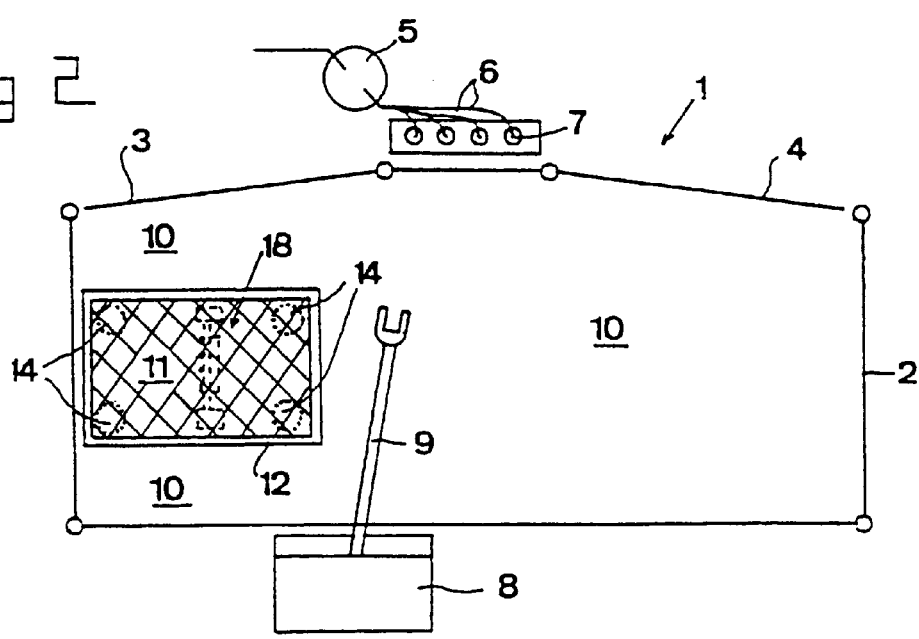
FIG. 2 shows a view from above of a second embodiment of a milking stall according to the present invention.

FIG. 2 discloses a second embodiment of the milking stall 1. It should be noted that elements having a corresponding function have been provided with the same reference signs in all the embodiments disclosed. The embodiment disclosed in FIG. 2 differs from the one of FIG. 1 in that the secondary floor portion 11 has a rectangular shape and merely is intended to position the cow with respect to the distance between her rear legs. Moreover, the secondary floor portion 11 disclosed in FIG. 2 is visibly indicated or marked in such a manner that it is recognizable by the animal. Such a marking may e.g. be realized by a visible pattern; as disclosed, differing from the pattern of the primary floor portions 10, or by a colour differing from the colour of the primary floor portions.

Figure 3:
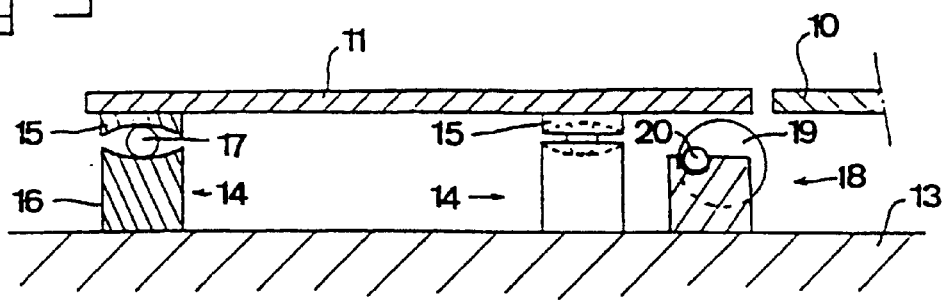
FIG. 3 shows a sectional view along the line III—III in FIG. 1.

As appears from FIGS. 1 and 3, the secondary floor portion 11 is supported on the ground 13 by means of four support devices 14 having a first member 15 attached to the underside of the secondary floor portion 11 and a second member 16 resting on the ground 13. The first and second members 15, 16 comprise first and second concave support surfaces, respectively, which are facing each other. Between the first and second support surfaces of each support device 14, there is provided a ball 17, for example a steel ball. Consequently, the support devices 14 support the secondary floor portion and allow it to wobble since the ball 17 may roll in any direction on the first and second support surfaces. Due to the concave shape of the first and second support surfaces the secondary floor 11 portion will tend to take a rest position disclosed in FIG. 3. It should be noted that the number of support devices 14 may be varied. For instance, each outer corner of the secondary floor portion 11 disclosed in FIG. 1 may be provided with a support device 14, i.e. six such devices.

FIG. 4 discloses an alternative embodiment of the support device 14 and differs from the one of FIG. 3 merely in that the first and second support surfaces of the support devices 14 are essentially planar and surrounded by a projecting edging.

The secondary floor portion 11 may be locked in the rest position disclosed in FIG. 3 by means of a locking device 18. The locking device 18 may be put in one of a first position, at which the secondary floor portion 11 is locked, and a second position at which the secondary floor portion 11 is unlocked and thus unsteady. The locking device 18 disclosed in FIGS. 1, 3, 4 and 5 comprises a cam device 19 in the form of a cam disk being eccentrically mounted on a shaft 20 which is supported in a bearing structure resting on the ground and rotatable about an axis by means of an hydraulic or pneumatic cylinder 21. The cylinder 21 houses a piston pivotably connected to an arm 22 which is fixed to the shaft 20. By moving the piston in the direction 23, the cam disk 19 will be moved against the underside of the secondary floor portion 11 and thereby locking the secondary floor portion 11 in a fixed position. It should be noted that the cam disk 19 at least in the locked position may function as a further support to the secondary floor portion 11.

FIG. 6 discloses an alternative embodiment of the locking device 18, which comprises a piston device having a movable piston 24 housed in a cylinder 25. The piston 24 is movable in an essentially vertical direction. The cylinder 25 may be hydraulically or pneumatically operated by the supply of a medium under pressure through a pressure conduit 26 in order to raise or lower the piston 24. The secondary floor portion 11 is locked by raising the piston 24 in the essentially vertical direction against the underside of the secondary floor portion 11. Also the piston device 24 may in the locked position function as a support to the secondary floor portion 11. Moreover, with reference to FIG. 2 it should be noted that the locking devices 18 may be located anywhere beneath the secondary floor portion 11, for instance beneath a front part as disclosed in FIG. 1 or a central part as disclosed in FIG. 2.

When a cow is to enter the milking stall 1 the secondary floor portion 11 may be locked in a fixed, steady position which is in essentially the same plane as the primary floor portions 10. When the cow is present in the milking stall 1 the secondary floor portion 11 may be unlocked by means of the locking device 11, and consequently the secondary portion 11 will be unsteady and perform a wobbling movement when the cow puts one of her feet thereon. This is not very comfortable to the cow and therefore she will place her feet on a more steady floor, i.e. the primary floor portion. When the cow is positioned on the primary floor portions 10 the teatcups 7 may easily and without being hindered be attached to the teats of the cow by means of the automatic handling device 8.

FIG. 7 discloses a further embodiment of the present invention in which a drive means 27 is provided to generate a wobbling movement of the second floor portion 11. The drive means 27 may comprise an eccentrically rotating drive shaft 28 rotatably journalled in a receiving means 29 attached to the second floor portion 11. In order to allow the vertical movement of the secondary floor portion 11, the shaft 28 is slidably supported in the receiving means 29. Consequently, when the second floor portion 11 is unlocked, the drive means 27 may automatically be activated to move the second floor portion to perform such a wobbling movement.

The present invention is not limited to the embodiments disclosed but may be varied and modified within the scope of the following claims.

The secondary floor 11 portion may have many different configurations depending on the position which it is desired that the cow should have. For instance, it may in some application be desired to position the front legs of the cow at a certain distance from each other.

The present invention may be applied to other animal-related actions than milking, e.g. medical treatment, insemination, cleaning, massaging, etc.

Although the present invention has been explained in connection with cows, it should be understood that the inventive idea also may be applied to other animals, for example sheep, goats, horses, buffaloes.

What is claimed is:

1. In apparatus for controlling the position of an animal in a space having a floor in order to facilitate the performance of an animal-related action, said floor comprising at least one primary floor portion, at which it is desirable that the animal stands during said performance, and at least one secondary floor portion, at which it is desirable that the animal does not stand during said performance, the improvement comprising activatable means provided to enable a wobbling movement of said secondary floor portion upon activation.

2. An apparatus according to claim 1, wherein said activatable means comprises a support device provided to support the secondary floor portion and to allow said wobbling movement.

3. An apparatus according to claim 2, wherein said support device comprises a first support surface associated with said second floor portion, a second support surface associated with the ground, and a ball-shaped member provided between said surfaces.

4. An apparatus according to claim 3, wherein said first and second support surfaces are concave.

5. An apparatus according to claim 1, wherein said activatable means comprises a drive means provided to generate said wobbling movement.

6. An apparatus according to claim 1, wherein said activatable means comprises a locking device adapted to be put in one of a first position, at which the secondary floor portion is locked, and a second position at which the secondary floor portion is unlocked and thus unsteady.

7. An apparatus according to claim 6, wherein the locking device comprises a cam device being rotatable between said first position, at which the cam device abuts the secondary floor portion, and said second position.

8. An apparatus according to claim 6, wherein the locking device comprises a piston device movable between said first position, at which the piston device abuts the secondary floor portion, and said second position.

9. An apparatus according to claim 1, including means for performing said animal-related action regarding the animal being present in said space.

10. An apparatus according to claim 9, wherein said performing means comprises an automatic handling device and animal-related means to be handled by said automatic handling device.

11. An apparatus according to claim 10, wherein said animal-related means comprises at least one teatcup to be attached to a teat of said animal by said automatic handling device.

12. An apparatus according to claim 1, wherein the secondary floor portion is visibly indicated in such a manner that it is recognizable by the animal.

13. A method of controlling the position of an animal in a space having a floor in order to facilitate the performance of an animal-related action, said floor comprising a primary floor portion, at which it is desirable that the animal stands during said performance, and a secondary floor portion, at which it is desirable that the animal does not stand during said performance, said method including the steps of:

locking both the floor portions in a steady condition when the animal enters said space; and enabling wobbling of the secondary floor portion during the performance of said animal-related action.

14. A method according to claim 13, including locking the secondary floor portion in said steady condition when the animal leaves said space.

* * * * *